Dec. 31, 1968     A. BAUMGARTNER     3,418,884
CAVITY SHAPING MACHINE
Filed Jan. 5, 1967     Sheet 3 of 3
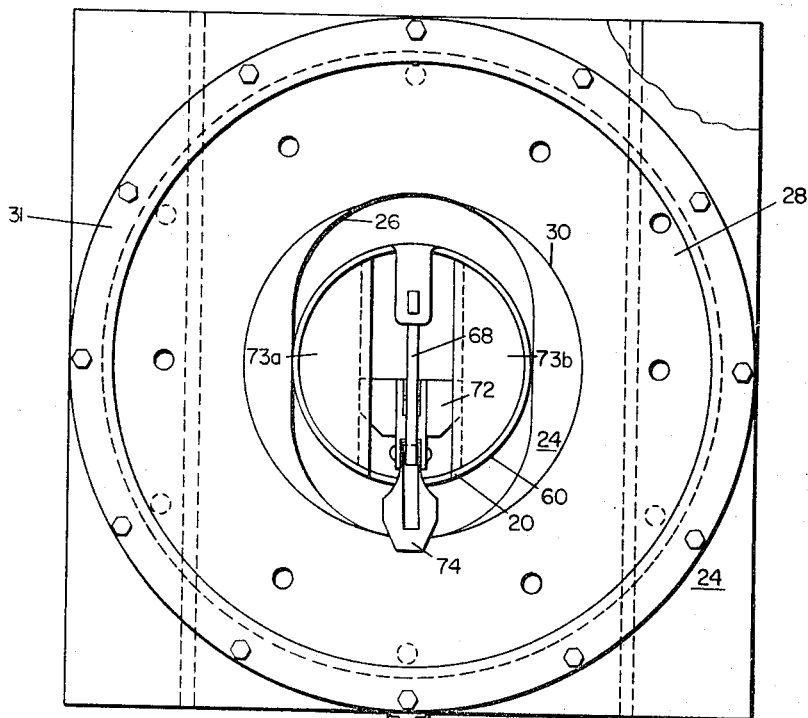
FIG. 4
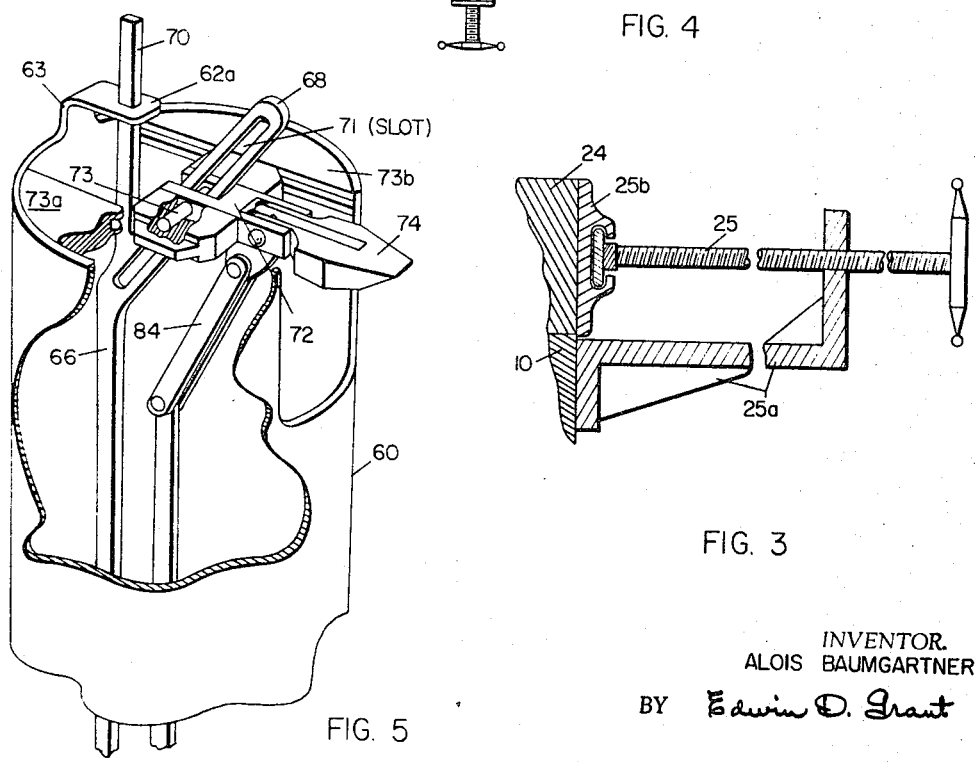
FIG. 5
FIG. 3
INVENTOR.
ALOIS BAUMGARTNER
BY Edwin D. Grant
ATTORNEY United States Patent Office 3,418,884
Patented Dec. 31, 1968

3,418,884
CAVITY SHAPING MACHINE
Alois Baumgartner, Chatsworth, Calif., assignor to Thiokol Chemical Corporation, Bristol, Pa., a corporation of Delaware
Filed Jan. 5, 1967, Ser. No. 607,534
3 Claims. (Cl. 90—43)

ABSTRACT OF THE DISCLOSURE

A cutting machine wherein a cutter is mounted for movement toward and away from the longitudinal axis of a reciprocating drive shaft, and having a workpiece support table rotatable relative to the longitudinal axis of said drive shaft.

---

This invention relates to a machine for shaping a cavity in a workpiece and more particularly to a machine for shaping the combustion cavity of a solid propellant rocket motor.

In the manufacture of solid propellant rocket motors having star-shaped or other noncylindrical combustion cavities, it has been a general practice to place in a rocket motor casing a mandrel having the shape of the cavity to be formed and then pour liquid propellant between this mandrel and the casing, the propellant thereafter being cured to the sold state and the mandrel withdrawn therefrom. Although such mandrels are expensive to make, often they must be discarded after a preliminary test of the rocket motor formed therewith has proved its cavity design to be unsatisfactory. Furthermore, mandrels are sometimes difficult to remove from the propellant in which they are positioned, particularly when mandrels have a plurality of radially extending flanges thereon for forming star or other cavity shapes in propellant charges, and mandrels also are limited in application to propellant charges having combustion cavities of uniform cross-section or those in which the combustion cavity increases in diameter toward the end of the motor casing from which the mandrel must be removed.

Because of the aforementioned and other disadvantages associated with the forming of solid propellant combustion cavities by use of removable mandrels, such cavities have in the past also been formed by macining operations. Certain of the previously developed machines for this purpose have overcome the limitations inherent in the manufacture of rocket motors by use of mandrels, but most of these machines are complicated in design and thus expensive to construct, operate and maintain.

Accordingly, it is a broad object of this invention to provide an uncomplicated and thus inexpensive machine for shaping a combustion cavity in a solid propellant charge.

Another object of this invention is to provide a cavity-forming machine having uncomplicated and easily adjustable means for controlling the motion of the cutter thereof from a point remote from said cutter.

Still another object of this invention is to provide a machine by means of which radially extending recesses can be cut in the end of the combustion cavity of a solid propellant charge.

Other objects and advantages of the present invention will become apparent in the following description of a preferred embodiment thereof, considered in conjunction with the accompanying drawings, in which:

FIGURE 3 is a detail view of components of the preferred embodiment;

FIGURE 4 is a plan view of the preferred embodiment, with the rocket motor casing removed; and FIGURE 5 is a detail view of components of the preferred embodiment.

Figure 1:
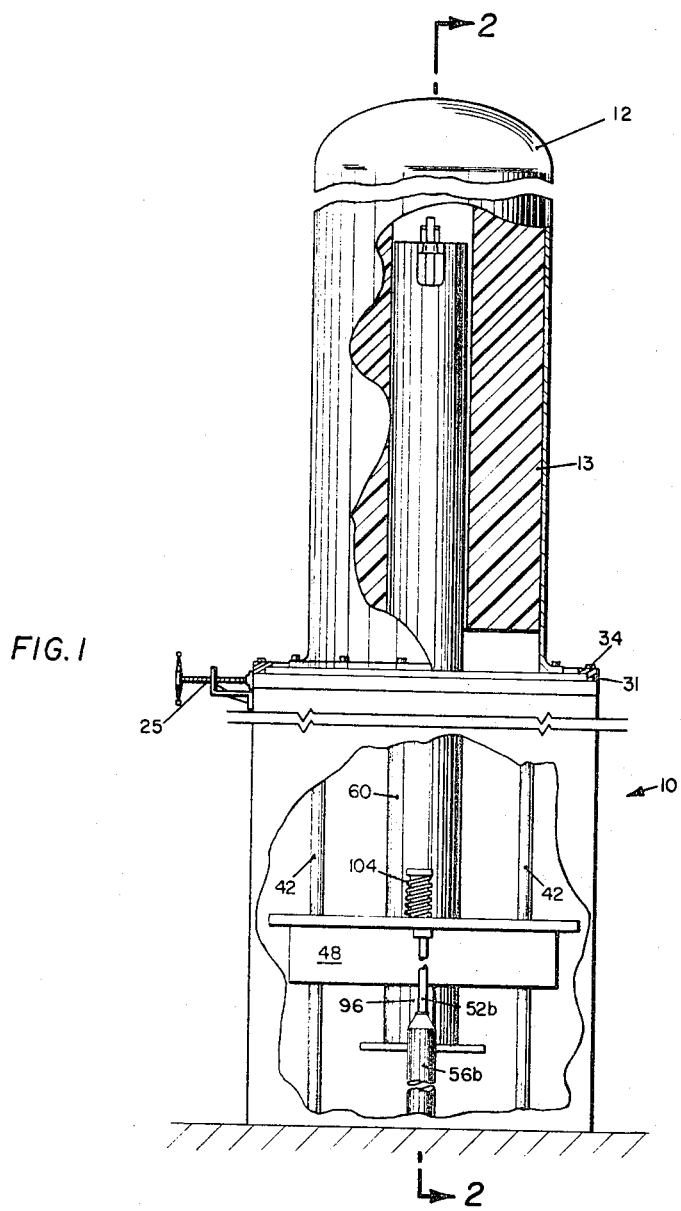
FIGURE 1 is a partially fragmentary side view of the preferred embodiment of the invention, illustrated with a solid propellant rocket motor casing positioned on the machine.

As illustrated in FIGURE 1, a cavity-shaping machine constructed in accordance with the principles of this invention comprises a four-sided base, generally designated by the number 10, upon which can be positioned a solid propellant rocket motor casing 12 containing a solid propellant grain 13. It can be seen in FIGURE 2 that base 10 includes a base plate 14 and top plate 15 both of which are fixedly attached, as by welding, to the vertical walls 16 of said base. Top plate 15 has a hole 20 centrally located therein and an integral dovetail portion 22 that extends across the upper surface thereof. Surfaces of a dovetail recess formed in the lower portion of a first support plate 24 are slidably engaged with the mating surfaces of dovetail portion 22 of top plate 15. Support plate 24 can be moved transversely relative to top plate 15 by means of a lead screw 25 operably engaged with both of said components. As can be seen in FIGURE 3, lead screw 25 is threadedly engaged to a bracket 25a which is fixed to the base 10, and the end of lead screw 25 bears against a pivot bearing 25b, which is fixed to support plate 24 so that the latter can be moved relative to bracket 25a and base 10. In FIGURE 4 can be seen a slot 26 which extends through support plate 24, this slot being aligned with sole 20 in top plate 15 and extending in parallel relation to the side edges of the dovetail portion 22 of said top plate so as to permit limited transverse movement of support plate 24 (such movement being accomplished by means of lead screw 25) without it covering hole 20. A second disk-shaped support plate 28 is rotatably mounted on support plate 24, a hole 30 being formed in said support plate. As can be seen in FIGURE 4, the diameter of hole 30 is equal to the length of the slot 26 in support plate 24, and thus support plate 28 does not cover hole 20 when support plate 24 is moved across top plate 15 from the position illustrated in FIGURE 4 to a second position wherein the end of said slot is even with the edge of said hole 20. As can best be seen in FIGURE 2, a retaining ring 31 is disposed adjacent the peripheral edge 32 of support plate 28, this ring including an inwardly-projecting shoulder 33 the lower surface of which is disposed adjacent the upper edge surface of said support plate. Ring 31 is fixedly secured to support plate 24 by means of a plurality of bolts 34. A locking pin 35 is slidably positioned within a hole 36 extending vertically through support plate 28, said locking pin also being positioned, when support plates 24 and 28 are locked together, within a selected one of a plurality of holes 38 formed in support plate 24 and equidistant from the center thereof. Rocket motor casing 12 is fixedly secured to support plate 28 by means of a plurality of bolts 40 or other suitable means.

Figure 2:
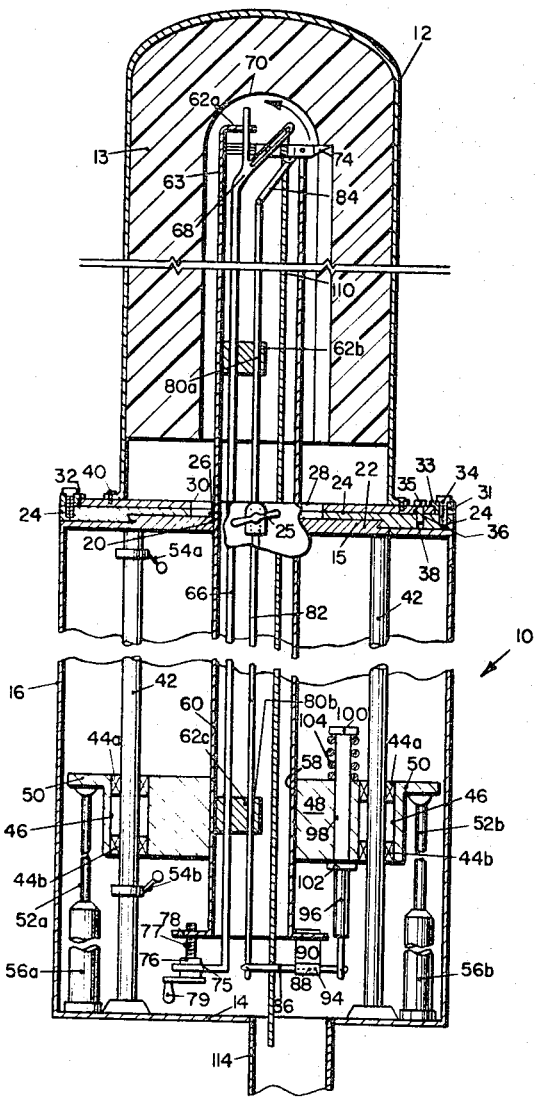
FIGURE 2 is a sectional view of the preferred embodiment taken along a plane represented by line 2—2 of FIGURE 1.

In FIGURE 2 can also be seen two of four guide rods 42 each of which is fixedly secured to both base plate 14 and top plate 15 of base 10 and disposed in perpendicular relation thereto. Each guide rod 42 is slidably disposed within two bushings 44a, 44b that are in turn fixedly disposed with a respective one of four holes 46 that are formed in a guide block 48 adjacent respective corners thereof. Guide block 48 also includes an integral outwardly extending flange 50 to which are attached two drive shafts 52a, 52b. Two control switches 54a, 54b are adjustably mounted on one of the guide rods 42 and operable interconnected with the flow control system (not shown) that operates two double-acting hydraulic or pneumatic cylinders 56a, 56b in which shafts 52a, 52b are respectively positioned, the lower ends of said cylinders being fixedly attached to base plate 14.

Centrally disposed in guide block 48 is a hole 58 in which a tubular shaft 60 is fixedly positioned, as by means of a forced fit therein. Shaft 60 is disposed perpendicular to top plate 15 and extends through hole 20 therein, and through slot 26 in support plate 24 and hole 30 in support plate 28. Three support members 62a, 62b, 62c are fixedly secured to shaft 60 and spaced linearly along the length thereof, the uppermost of these support members being disposed at the upper end of a relatively narrow, vertical projection 63 (see FIGURE 5) that is an integral extension of the wall of shaft 60. A hole of rectangular cross-section is formed in each support member 62a, 62b these holes being axially aligned with each other and having a first control bar 66 slidably positioned therein. As illustrated in FIGURE 5, control bar 66 includes an integral upper portion 68 which is disposed oblique to the lower portion thereof and also includes a projection 70 which is integral with said oblique portion 68 and disposed parallel to said lower portion of said control bar. Projection 70 on control bar 66 is slidably positioned within a hole in support member 62a. A slot 71 is formed in the oblique upper portion 68 of control bar 66, this slot providing a cam surface disposed oblique to the longitudinal axis of the lower portion of said control bar. One end of a support block 72 is formed with a slot the sides of which slidably engage the sides of the upper portion 68 of control bar 66, the support block 72 being slidably secured to said upper portion 68 by a pin 73 which extends through slot 71 and into two holes which respectively extend from the sides of the aforementioned slot in support block 72. Each end of support block 72 is slidably engaged within a slot formed in the inner edge surface of a respective one of two guide members 73a, 73b which are fixedly mounted on the inner wall of shaft 60 and disposed perpendicular to the longitudinal axis thereof. Thus pin 73 serves as a cam follower that is in slidable contact with the cam surfaces on control bar 66 defined by slot 71 therein, and if control bar 66 is moved upward or downward from its illustrated position in FIGURE 5, then support block 72 will be moved toward or away from projection 63 on support shaft 60 respectively. The end of support block 72 remote from the upper portion 68 of control bar 66 is slotted to provide two integral, parallel arms on the support block, one end of a cutter 74 being pivotally mounted between these arms. Cutter 74 has a slot extending longitudinally thereof so that it can be pivoted to a vertical position without striking the upper portion 68 of control bar 66.

As illustrated in FIGURE 2, the lower end of control bar 66 is provided with an integral projection 75. The head 76 of a screw 77 is rotatably engaged with projection 75 and the shank of said screw is threadedly engaged within a hole in a flange 78 integral with shaft 60, said head of screw 77 being provided with a handle 79 to facilitate manual turning thereof.

Each support member 62b, 62c also includes a second hole 80a, 80b of rectangular cross-section in which is slidably positioned a second control bar 82. The upper end of control bar 82 is pivotally connected to one end of a link 84, the other end of said link being pivotally connected to cutter 74. The lower end of control bar 82 is pivotally connected to one end of a lever 86 which is itself pivotally mounted by means of a pin 88 on a support block 90 fixedly secured to the integral outwardly projecting flange 78 of shaft 60. Block 90 includes a plurality of linearly spaced holes 94 in which pin 88 can be shifted to change the leverage of lever 86. The other end of lever 86 is pivotally connected to a plunger 96 which is slidably positioned within a hole 98 in guide block 48 and which extends above the upper surface thereof. Plunger 96 is provided with an integral head 100, and with a collar 102, this collar including a set screw (not shown) permitting it to be fixed at different vertical positions on plunger 96. Plunger 96 is biased in an upward direction by a spring 104 positioned around said plunger between its head 100 and the upper surface of guide block 48.

The preferred embodiment of the invention is provided with a shield 110 which is positioned across the interior of shaft 60 and extends from the upper end of portion 68 of control bar 66 to a point within the end of a pipe 114, said shield being provided with a vertical slot at its upper portion through which cutter 74 extends. Material which is removed from the interior walls of charge 13 by cutter 74 and which enters shaft 60 is channeled by shield 110 into pipe 114 attached to base plate 14.

The above-described preferred embodiment of the present invention can be used to shape and enlarge the combustion cavity of a rocket motor, which, however, must initially have a diameter at least slightly larger than that of shaft 60. The length of shaft 60, base 10, guide rods 42 and drive shafts 52a, 52b must be such that a cavity of the desired length can be formed, and it will be obvious that the construction of the preferred embodiment of the invention permits these components to vary considerably with respect to their length. It will also be recognized that the necessity of first forming a hole in a grain or charge, the combustion cavity of which is to be shaped by use of the desired and illustrated machine, does not unduly limit the utility of the machine, since a mandrel can readily be withdrawn from the grain after it has been cured. Before the rocket motor 12 is secured to support plate 28, control bar 66 is longitudinally positioned with respect to shaft 60 so that pin 73 is disposed at the lower end of slot 71 in said control bar and cutter 74 is in a retracted position, i.e., shifted to the left of its position illustrated in FIGURE 2. After the rocket motor casing 12 containing a perforated charge 13 has been fixedly secured to support plate 28 by means of bolts 40, with the hole in said charge being axially aligned with shaft 60, the first control bar 66 is moved downwardly with respect to shaft 60 by turning screw 77. Consequently, movement of control bar 66 downwardly shifts the position of pin 73 upwardly with respect to slot 71 of control bar 66 and support block 72 connected thereto is moved away from the portion of the wall of shaft 60 adjacent projection 63 and toward the wall of the combustion cavity of charge 13 facing the opposite side of shaft 60. Conversely, movement of control bar 66 upwardly shifts the position of bolt 72 downwardly with respect to slot 71, and cutter 74 away from the aforementioned portion of the wall of the combustion cavity of charge 13. Thus, the movement of cutter 74 toward or away from charge 13 is readily controllable by simply turning screw 77, which moves the cutter in a direction transverse to the longitudinal axis of shaft 60. After the proper adjustment of the position of cutter 74 has been made as described immediately hereinbefore, the flow control system (not shown) connected with cylinders 56a, 56b can be actuated so that drive shafts 52a, 52b are moved upwardly, thereby also moving guide block 48 and shaft 60 upwardly and driving cutter 74 into charge 13 and upwardly along the length thereof. As guide block 48 nears top plate 15, the head 100 of plunger 96 contacts the lower surface of said top plate 15. The end of lever 86 connected to the lower end of plunger 96 thereafter remains in a fixed position with respect to top plate 15. However, the support block 90 which is attached to shaft 60 continues to move toward top plate 15 and therefore also pulls the end of lever 86 connected to control bar 82 upwardly. Thus, the position of lever 86 relative to shaft 60 is changed in such a way that control bar 82 is shifted upwardly with respect to shaft 60, and cutter 74 connected to said control bar 82 is pivoted in the direction of the arrow in FIGURE 2, namely, in a direction which swings the cutting edge of said cutter away from the vertically disposed wall of the combustion cavity in charge 13 and into the end wall thereof. Hence, cutter 74 cuts a groove in charge 13 that extends longitudinally of the side wall and radially of the end wall of the original hole in charge 13. At the end of the cutting stroke of the machine, the upper surface of guide block 48 contacts the arm to switch 54a which then operates through means (not shown) interconnected with the flow control system that actuates cylinders 56a, 56b to reverse the direction of travel of drive shafts 52a, 52b therein. Switch 54b likewise controls the downward travel of guide block 48. The width of the groove cut by cutter 74 in charge 13 can be increased by moving support plate 24 transversely relative to top plate 15 and making successive cuts in said charge with said cutter. By connecting suitable drive motors to both lead screw 25 and screw 77 and by programming the operation of such motors, a groove of any contour can be cut in the charge 13. After a groove of the desired depth and width has been formed at one particular portion of the wall of charge 13, cutter 74 can be retracted by means of screw 77, the locking pin 35 can be moved out of the hole 38 in support plate 24 in which it had been positioned, and support plate 28 can then be rotated to bring another portion of the wall of the combustion cavity in charge 13 adjacent cutter 74. Collar 102 can be moved to different vertical positions on plunger 96 to vary the length of said plunger projecting above the upper surface of guide block 48 and thus control the above-described pivotal motion of cutter 74 at the end of its cutting stroke. Since the depth of cut made by cutter 74 is controllable by means of screw 77, the diameter of the combustion cavity of a rocket motor 12 can be varied along its length either by turning said screw manually as cutter 74 is moved upwardly, or preferably by programming the rotary motion of said screw with a suitable electro-mechanical system (not shown) of a type well known in the art.

The above-described preferred embodiment of this invention thus provides an effective yet uncomplicated machine for shaping the combustion cavity of a solid propellant rocket motor. However, since variations can be made in the described machine within the spirit and scope of the invention, the detailed description thereof is not to be considered as limitative except in the light of the following claims.

What is claimed is:

1. A machine for shaping a cavity in a workpiece comprising:
   a base;
   a first support plate mounted on said base and movable in a transverse direction relative thereto;
   drive means operably connected to said base and first support plate and adapted to move said first support plate in said transverse direction;
   a second support plate mounted on said first support plate and rotatable about an axis disposed perpendicular thereto;
   means for locking said second support plate to said first support plate at a selected rotational position with respect thereto;
   means for fixedly mounting a workpiece on said second support plate;
   a shaft operably connected to said base, said shaft being movable along its longitudinal axis in a direction parallel to the axis of rotation of said second support plate;
   shaft drive means adapted to move said shaft in opposite directions along the longitudinal axis thereof;
   means operably connected to said shaft drive means for limiting the range of movement of said shaft;
   a support member fixedly mounted on said shaft adjacent one end thereof;
   a first control bar slidably engaged with said support member and movable axially in a direction parallel to the longitudinal axis of said shaft, said first control bar including a cam surface disposed oblique to the longitudinal axis thereof;
   a cam follower pivotally connected to said first control bar and in slidable contact with said cam surface thereof;
   a cutter pivotally connected to said cam follower;
   a second control bar pivotally connected to said cutter;
   first positioning means for selectively positioning said first control bar longitudinally of said shaft, so that said cam follower is moved along said cam surface of said first control bar and in a direction transverse to the longitudinal axis of said shaft; and
   second positioning means for selectively positioning said second control bar longitudinally of said shaft, so that said cutter is rotated about said cam surface of said first control bar and disposed at a variable angular position with respect to said shaft.

2. A machine as defined in claim 1 wherein:
   said cam surface of said first control bar is defined by a slot formed therein; and
   said cam follower comprises a pin disposed within said slot.

3. A machine as defined in claim 1 wherein:
   said first positioning means comprises a screw engaged with said shaft and first control bar; and
   said second positioning means comprises a plunger which is carried by said shaft and which is movable longitudinally with respect thereto, means for biasing said plunger in one direction with respect to said shaft, means for limiting the range of movement of said plunger, and a lever having one end thereof pivotally connected to said second control bar and the other end thereof pivotally connected to said plunger.

References Cited

UNITED STATES PATENTS

| | | | |
|---|---|---|---|
| 1,466,062 | 8/1923 | Rhodes | 90—43 |
| 2,392,536 | 1/1946 | Kline et al. | 90—43 |
| 2,771,820 | 9/1956 | Meyers et al. | 90—43 |

ANDREW R. JUHASZ, *Primary Examiner.*

G. WEIDENFELD, *Assistant Examiner.*

U.S. Cl. X.R.

77—58